(12) United States Patent
Ito et al.

(10) Patent No.: US 7,013,474 B2
(45) Date of Patent: Mar. 14, 2006

(54) DISK DRIVE APPARATUS HAVING MOVABLY-POSITIONED VIBRATION-ABSORBING MEMBER

(75) Inventors: Katsushi Ito, Tokyo (JP); Yuji Shida, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 256 days.

(21) Appl. No.: 10/012,215

(22) Filed: Oct. 19, 2001

(65) Prior Publication Data

US 2003/0076654 A1  Apr. 24, 2003

(51) Int. Cl.
G11B 33/08 (2006.01)
(52) U.S. Cl. ...................................................... 720/692
(58) Field of Classification Search ................ 369/263, 369/75.1, 75.2; 720/692, 693, 694
See application file for complete search history.

(56) References Cited

U.S. PATENT DOCUMENTS

| | | | |
|---|---|---|---|
| 4,553,231 A * | 11/1985 | d'Alayer de Costemore d'Arc | 369/263 |
| 4,703,470 A * | 10/1987 | Castagna et al. | 369/215 |
| 5,166,918 A * | 11/1992 | Kamijo | 369/77.1 |
| 5,608,705 A * | 3/1997 | Tanaka | 369/77.1 |
| 5,737,304 A * | 4/1998 | Soga et al. | 369/247 |
| 5,768,249 A * | 6/1998 | Ro et al. | 369/263 |
| 5,956,314 A * | 9/1999 | Ishimatsu et al. | 369/247 |
| 6,002,658 A * | 12/1999 | Aso et al. | 369/75.1 |
| 6,034,941 A * | 3/2000 | Ro | 369/263 |
| 6,349,084 B1 * | 2/2002 | Ariyoshi | 369/263 |
| 6,456,580 B1 * | 9/2002 | Lee | 369/75.1 |

FOREIGN PATENT DOCUMENTS

| | | | |
|---|---|---|---|
| EP | 1 094 457 A2 | | 4/2001 |
| JP | 58035701 A | * | 3/1983 |
| JP | 02098863 A | * | 4/1990 |
| JP | 05054621 A | * | 3/1993 |
| JP | 5-101506 | | 4/1993 |
| JP | 06236671 A | * | 8/1994 |
| JP | 08021486 A | * | 1/1996 |
| JP | 10-208357 | | 8/1998 |

OTHER PUBLICATIONS

English Translation of Kiyoshi et al. JP 10-208357, Aug. 7, 1998.*

* cited by examiner

Primary Examiner—William Korzuch
Assistant Examiner—Christopher R. Magee
(74) Attorney, Agent, or Firm—Katten Muchin Rosenman LLP (57) ABSTRACT

A disk drive apparatus has a main apparatus, a disk tray, a disk rotational drive unit, an optical pickup mechanism, a movable member, an elevator drive mechanism, a protrusion provided on the movable member, and a vibration-absorbing member provided on the protrusion. The disk tray causes a disk to move between a stored position and a drawn-up position relative to the main apparatus. The movable member supports the disk rotational drive unit and the optical pickup mechanism and is mounted to the frame of the main apparatus so that one end is free to rotate. The elevator drive mechanism causes the disk rotational drive unit and optical pickup mechanism to approach and move away from the disk, with the movable member free to move up and down. The protrusion extends toward one end of the movable member. The movable member is provided with the vibration-absorbing member.

15 Claims, 6 Drawing Sheets

| Weight (g) | Two cushions | | One cushion | | No cushions | |
|---|---|---|---|---|---|---|
| | Horizontal Placement | Vertical Placement | Horizontal Placement | Vertical Placement | Horizontal Placement | Vertical Placement |
| 0 | 59.7 | 55.3 | 60.1 | 55.3 | 60.5 | 55.4 |
| 0.1 | 62.0 | 57.2 | 65.4 | 56.6 | 75.1 | 70.8 |
| 0.2 | 70.5 | 61.3 | 73.9 | 69.0 | 81.5 | 74.6 |
| 0.3 | 74.1 | 66.2 | 78.1 | 72.0 | 84.3 | 77.0 |

(Units: dB)

DISK DRIVE APPARATUS HAVING MOVABLY-POSITIONED VIBRATION-ABSORBING MEMBER

BACKGROUND OF THE INVENTION

1. Field of the Invention

The present invention relates to disk drive apparatus having a structure in which a disk is placed onto a disk tray and loaded within the apparatus proper.

2. Description of the Related Art

In a known disk drive apparatus, for example, a disk such as a CD, a CD-ROM, or a DVD is placed on a disk tray and loaded into the disk apparatus proper, whereupon a disk rotational drive mechanism and an optical pickup within the disk drive apparatus read information recorded on the disk or write information onto the disk.

In a disk drive apparatus of the type in which a disk tray is loaded into the disk drive apparatus proper, while disk drive is being done in order to read recorded information from the disk, the disk tray is in substantially a free condition within the disk drive apparatus proper. For this reason, vibration caused by rotation of the disk and seeking by the optical pickup is transmitted to the disk tray, and problems arise, such as the disk interfering with the disk tray when reading from or writing to the disk is done, or noise being generated, thereby preventing proper reading information from or writing information to the disk.

For example, in the Japanese laid-open patent application publication H5-101506, there is a proposal of the absorbing of vibration of the disk tray, wherein shock-absorbing material is provided on a pressure lever mounting to a chassis, this shock-absorbing material pressing up against the disk tray so as to absorb vibration of the disk tray. In the Japanese laid-open patent application publication H10-208357, there is a proposal of the suppression of vibration of the disk tray, by providing a protrusion on an inclined cam body which elevates and lowers a movable chassis onto which an optical pickup or the like is mounted, this protrusion being caused to come into contact with the optical pickup mechanism, for example, so as to press the disk tray toward the frame side, thereby suppressing vibration of the disk tray.

In the case of pressing shock-absorbing material providing on a pressure lever up against the disk tray, however, not only does the number of parts increase, but also it is necessary to have a mechanism for moving the pressure lever, thereby complicating the mechanism. In the approach of causing a protrusion provided on an inclined cam body to come into contact with the disk tray, although the structure is simple, because of the protrusion, which is made of metal or synthetic resin, wear of the protrusion makes it difficult to reliably suppress vibration of the disk tray.

SUMMARY OF THE INVENTION

Accordingly, it is an object of the present invention to provide a disk drive apparatus having simple construction and suppressing vibration of the disk tray, thereby enabling accurate reading of information from and writing of information to the disk.

In order to achieve the above-noted object, a disk drive apparatus according to the present invention has a main mechanism with a disk tray and a disk rotational driver mechanism (disk rotational drive unit), an optical pickup mechanism (optical pickup unit), a movable member, a elevating/lowering drive mechanism (elevator drive unit), a protrusion provided on the movable member, and a vibration-absorbing member provided on the protrusion. The disk tray causes the disk to move between a stored position and a drawn-up position relative to the overall apparatus. The disk rotational drive mechanism rotationally drives the disk. The optical pickup mechanism performs one of reading information from the disk and writing information to the disk. The moving member supports the disk rotational drive mechanism and the optical pickup mechanism, one end thereof being rotatably mounted to a frame of the overall apparatus. The elevator drive mechanism brings the disk rotational drive mechanism and optical pickup mechanism closer to or farther away from the disk, with the movable member free to rise and fall. The protrusion extends toward one end of the movable member. The vibration-absorbing member is provided on the protrusion, and when the disk moves to the stored position, the vibration-absorbing member presses against the reverse surface of the disk tray, opposite from the surface thereof on which the disk is placed.

According to the present invention, when the disk is brought to the stored position, because the vibration-absorbing member provided on the protrusion of the movable member presses against the reverse surface of the disk tray, opposite from the surface thereof on which the disk is placed, vibration caused by rotation of the disk or vibration caused by the seeking of the optical pickup is absorbed by the vibration-absorbing member, so that it is difficult for the vibration to be transmitted to the disk tray. For this reason, it is possible to accurately perform reading of information from and writing of information to the disk.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWING

The above and other features will be better understood from the exemplary embodiments described below, taken together with the drawings, of which.

DETAILED DESCRIPTION OF THE PREFERRED EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Preferred embodiments of the present invention are described in detail below, with references made to relevant accompanying drawings.

In a disk drive apparatus according to an embodiment of the present invention, a movable member, which causes a disk rotational drive mechanism (disk rotational drive unit) and an optical pickup mechanism (optical pickup unit) to be brought closer to or farther away from a disk, is provided with a vibration-absorbing member, which is caused to press against the reverse surface disk tray, thereby suppressing vibration of the disk tray. The more specific configuration of the disk drive apparatus is as follows.

Figure 1:
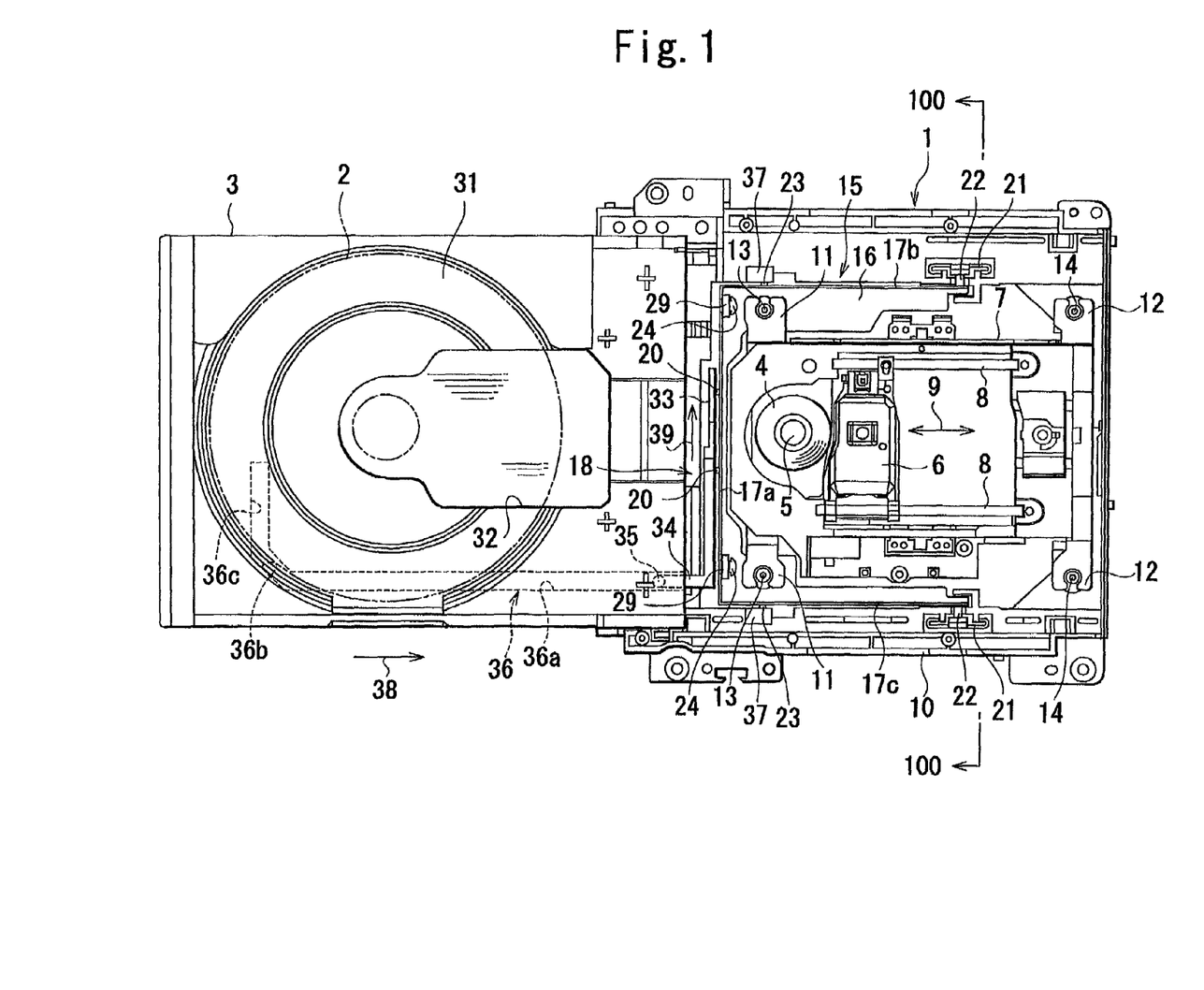
FIG. 1 is a plan view show an example of a disk drive apparatus according to an embodiment of the present invention, in which the disk is in the drawn-up position.

The disk drive apparatus, as shown in FIG. 1, has a main apparatus 1 and a disk tray 3, which causes a disk 2 to move between a stored position and a drawn-up position, relative to the main apparatus 1. The main apparatus 1 is provided with a spindle motor 5, having a turntable 4, which rotationally drives the disk 2, and an optical pickup mechanism 6, which performs at least one of reading of information from and writing information to the disk 2.

The spindle motor 5 and the optical pickup mechanism 6, as shown in FIG. 1, are provided in a disk drive unit 7. The spindle motor 5 is mounted at an end position of the disk drive unit 7. The optical pickup mechanism 6 can move freely in the radial direction of the disk 2, indicated by the arrow 9 of FIG. 1, by means of a pickup movement mechanism (not shown in the drawing), along the guide shafts 8, 8 which are provided in the disk drive unit 7.

The disk drive unit 7, as shown in FIG. 1, is provided with unit mounting parts 11 and 12, for mounting the disk drive unit 7 to a main frame 10 and a moving plate 15, which is described below. The unit mounting part 11, which is provided toward the front direction in which the disk tray 3 is drawn from the main apparatus 1, is fixed to the moving plate 15 by a screw (not shown in the drawing), with an intervening mounting insulator 13 therebetween. The unit mounting part 12, which is provided at the inside direction in which the disk tray 3 is stored into the main apparatus 1, is fixed to the moving plate 10 by a screw (not shown in the drawing), with an intervening mounting insulator 14 therebetween.

Figure 2:
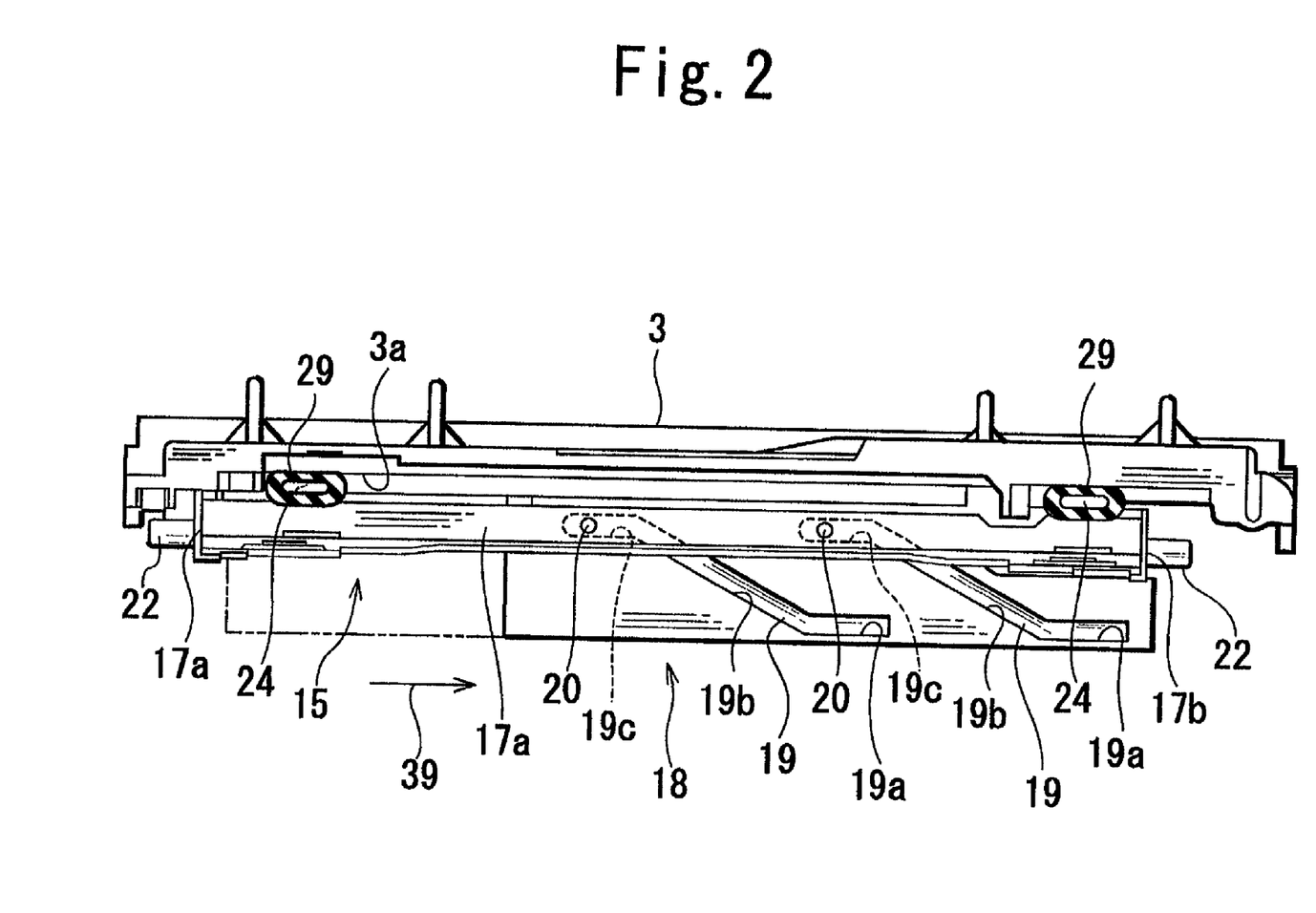
FIG. 2 is a view showing the condition of the vibration-absorbing member provided on the movable member pressing against the reverse surface of the disk tray, seen from the direction of the line 100—100 in FIG. 1.
Figure 3:
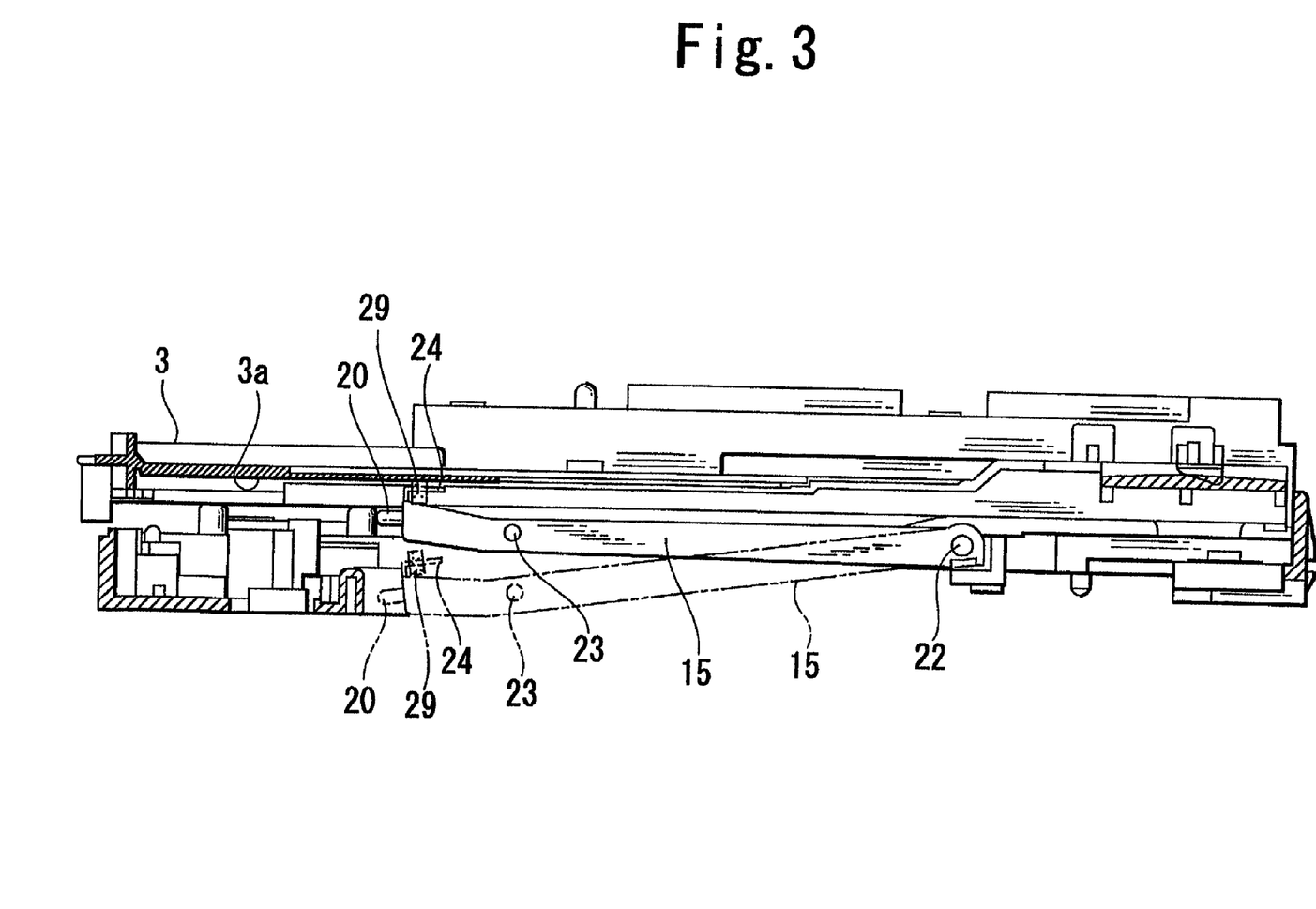
FIG. 3 is a side elevation showing the condition in which the vibration-absorbing member provided on the movable member pressing against the reverse surface of the disk tray.

The moving plate 15 serves to cause the disk drive unit 7 to move up and down, and is formed as a plate with a substantially U-shape when viewed from above. This moving plate 15, as shown in FIG. 1 to FIG. 3, has a main plate part 16, and side walls 17a, 17b, and 17c, which stand substantially perpendicularly from the outer peripheral edge thereof. The front-side side wall 17a is provided with mating protrusions 20, 20 that mate insert and mate with two cam grooves 19, 19 formed in an elevator slide plate 18, which is further described below. These mating protrusions 20, 20 are formed as cylindrical pins that insert into and mate with the cam grooves 19, 19.

The side walls 17b and 17c on each side are provided with a swinging pivot shaft 22, which freely rotates about a bearing part 21 provided on the main frame 10. The swinging pivot shaft 22 is provided at a rear edge position in the depth direction of the side walls 17b and 17c. The moving plate 15 swings about the above-noted swinging pivot shaft 22. The side walls 17b and 17c are provided with a guide pin 23, which guides the rising and falling of the moving plate 15. These guide pins 23 insert into and mate with guide grooves (not shown in the drawing) formed in a plate guide member 37, provided on the main frame 10, which is described further below, thereby guiding the rising and falling movement of the moving plate 15.

Figure 4:
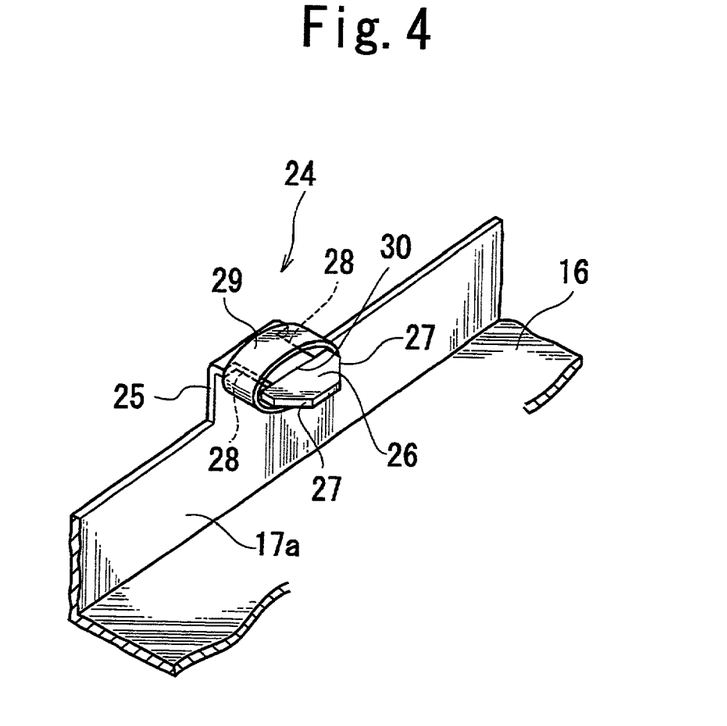
FIG. 4 is a partial enlarged oblique view showing the condition in the condition of the vibration-absorbing member mounted to the protrusion.
Figure 5:
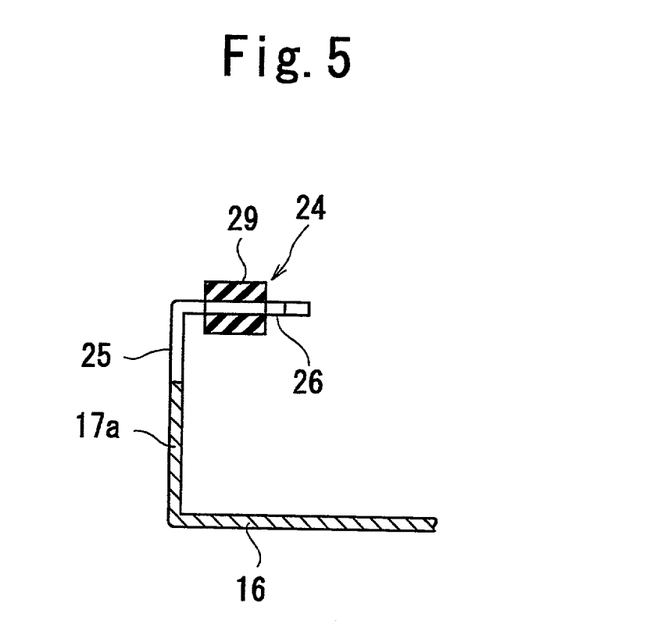
FIG. 5 is a cross-sectional view showing part of FIG. 4 cut away.

In this embodiment of the present invention, as shown in FIG. 1 and FIG. 4, a protrusion 24 extending in a direction which the disk 2 is inserted into the main apparatus 1 is provided at the upper edge of the side wall 17a at the front side of the moving plate 15. This protrusion 24 is formed by a rising piece 25, which extends upward from the upper edge of the front side wall 17a, and an attachment piece 26, which extends rearward from the end of the rising piece 25, substantially perpendicular thereto. The attachment piece 26 is substantially parallel to the disk 2 at a position in which the disk tray 3 is housed within the main apparatus 1. An inclined surface 27 is formed on the end of the attachment piece 26, so as to facilitate the insertion of the vibration-absorbing member 29, described further below. A cutout part 28 acting to prevent pull-out of the vibration-absorbing member 29 is formed on the two side edges of the attachment piece 26.

The vibration-absorbing member 29 is made of a resilient member of rubber or urethane or the like, and makes contact with the rear surface 3a of the disk tray 3 so as to absorb vibration transmitted to the disk tray 3. The vibration-absorbing member 29 is formed so as to be substantially elliptical, having a slit 30 in its center part, for insertion and mating with the attachment piece 26, and is inserted within the attachment piece 26. For this reason, even in a case in which oil or the like should become attached to the protrusion 24, it is possible to attach the vibration-absorbing member 29 to the attachment piece 26 without having to perform the troublesome task of cleaning away the oil or the like. Because the vibration-absorbing member 29 has the purpose of coming into contact with the rear surface 3a of the disk tray 3 so as to absorb vibration transmitted to the disk tray 3, it is desirable that this be formed so that there is a sufficient contact surface area between it and the rear surface 3a of the disk tray 3. It will be understood, of course, that the vibration-absorbing member 29 can alternately be circular, as long as it is possible to achieve a sufficient contact surface area by elastically deforming when it comes into contact with the rear surface 3a of the disk tray 3.

The disk tray 3, as shown in FIG. 1, has a disk cradle 31 into which a disk 2, which is a recording medium such as a CD or DVD, can be placed and held. An aperture 32 extend rearward along the tray center from a center position of the disk cradle 31 is formed in the disk tray 3. When the disk 2 is loaded into the loaded position of the main apparatus 1, the turntable 4 and the optical pickup mechanism 6 face this aperture 32.

The elevator slide plate 18 for raising and lowering the moving plate 15, as shown in FIG. 1, has a plate 33 for forming a cam, and a guide plate part 34, which is bent at a substantially right angle with respect to the base end of the cam-forming plate 33. The cam-forming plate 33 has formed on it two cam grooves 19, 19 into which the mating protrusions 20, 20 of the moving plate 15 are inserted and mate, so as to allow the moving plate 15 to rise and fall freely, so as to approach and move away from the disk tray 3. The cam grooves 19, as shown in FIG. 2, are formed by a lower end horizontal part 19a established at a position (a second position) so as to move the moving plate 15 away from the disk tray 3, an inclined portion 19b for moving the moving plate 15 so that it approaches the disk tray 3, and a horizontal part 19c established at a position (a first position) so as to move the moving plate 15 upward so as to approach the disk tray 3. On the rear end of the guide plate 34 is provided a guide protrusion 35 protruding toward the rear surface 3a of the disk tray 3. The guide protrusion 35 so formed so as to enter the guide groove 36 formed in the rear surface 3a of the disk tray 3.

As shown in FIG. 1, the guide groove 36 is formed by a straight groove 36a formed substantially in parallel with the direction of movement of the disk tray 3, an inclined groove 36b formed at the base end of the straight groove 36a, and a right-angle groove 36c formed so as to be continuous from the base of the inclined groove 36b. The straight groove 36a is provided along and in proximity to one edge of the disk tray 3, and is formed as a straight-line groove extending from the inserted end of the disk tray 3 up until the vicinity of the rear end. The inclined groove 36b is provided so as to be continuous with the base part of the straight groove 36a, and is inclined toward the center of the disk tray 3. This inclined groove 36b functions as a driving member so that when the guide protrusion 35 provided on the elevator slide plate 18 makes contact therewithin, the elevator slide plate 18 is caused to slide. The right-angle groove 36c is provided so as to be substantially perpendicular to the straight groove 36a, and is formed so as to extend to substantially the center position of the disk tray 3.

The main apparatus 1 is also provided with a loading mechanism (not shown in the drawing), which pulls the disk tray 3 into the main apparatus 1, and which also pulls the disk tray 3 out from the main apparatus 1.

The operation of a disk drive apparatus configured as described above is as follows.

As shown in FIG. 1, when an eject button (not shown in the drawing) is pressed or the disk tray 3 is pressed in the direction of the arrow 38 in FIG. 1 from the unloaded condition, so as to push in the disk tray 3, the disk tray 3 is pulled to within the main apparatus 1 by a loading mechanism (not shown in the drawing). The disk tray 3 is pulled deep into the main apparatus 1, and when the inclined groove 36b of the guide groove 36 reaches a position at which it comes into contact with the guide protrusion 35 provided on the elevator slide plate 18, the guide protrusion 35 comes into contact with an inner wall of the inclined groove 36b. When the guide protrusion 35 pushed against the inner wall of the inclined groove 36b, the elevator slide plate 18 slides in the direction of the arrow 39 as shown in FIG. 1 and FIG. 2.

When the elevator slide plate 18 slides, the moving plate 15 rises from the position distanced from the disk tray 3, indicated by the double-dot dashed line in FIG. 3 to the position close to the disk tray 3, indicated by the solid line. That is, by the sliding movement of the elevator slide plate 18 the mating protrusions 20, which had been positioned at the lower horizontal part 19a, rise up onto the inclined groove 19c, and finally reaches the upper horizontal groove 19c. When the mating protrusions 20, 20 reach the upper horizontal groove 19c, the vibration-absorbing member 29 provided at the rising end position of the moving plate 15 comes into pressure contact upward from beneath the rear surface 3a of the disk tray 3, so as to push it upward. When this occurs, the vibration-absorbing member 29 elastically deforms so as to come into intimate contact with the rear surface 3a of the disk tray 3. For this reason, vibration originating because of the rotation of the disk 2 or seeking of the optical pickup mechanism 6 is absorbed by the vibration-absorbing member 29, thereby enabling accurate reading of information from and writing of information to the disk 2.

When the moving plate 15 moves to the risen position, the turntable 4, spindle motor 5, and optical pickup mechanism 6 provided on the moving plate 15 are caused to rise, so that these elements face the aperture 32 provided in the disk tray 3. The disk 2 placed in the disk cradle 31 is chucked onto the turntable 4 and caused to rotate by the spindle motor 5, and either reading of information from or writing of information to the disk 2 is performed by the optical pickup mechanism 6.

Figure 8:
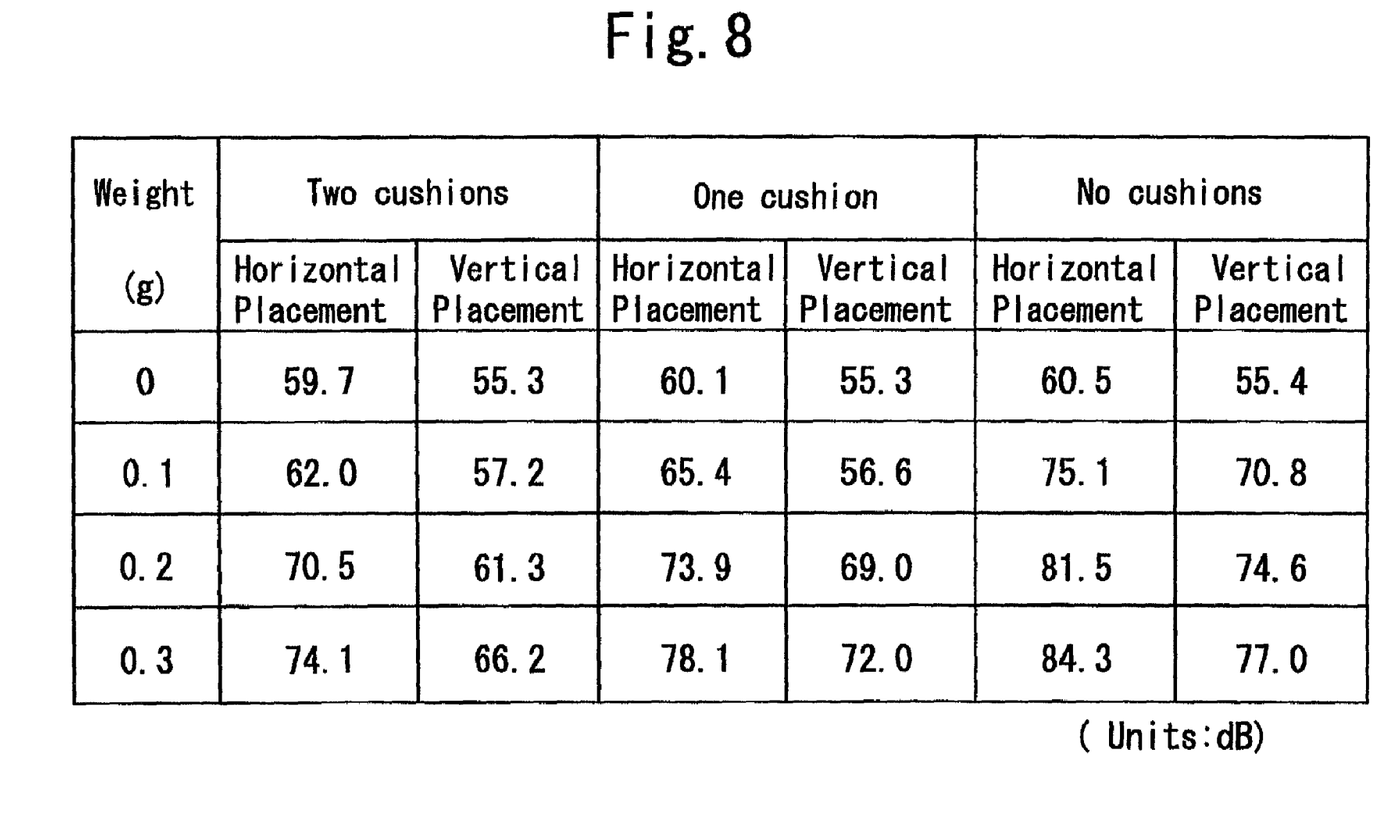
FIG. 8 is a table showing the results of measuring the noise generated in the case in which the vibration-absorbing member is provided and the case in which the vibration-absorbing member is not provided.

A comparison was performed between the case in which the above-noted vibration-absorbing member is provided and the case in which the vibration-absorbing member is not provided. The measurements were performed with a tape to act as a weight attached to a disk, with the weight being varied, a measuring instrument being placed at a distance of 5 cm from the set so as to measure noise. The results of these measurement are shown in FIG. 8. In FIG. 8, the term "horizontal placement" refers to horizontal placement of the recording surface of the disk, "vertical placement" refers to vertical placement of the recording surface of the disk, and "cushion" is the vibration-absorbing member.

As shown in FIG. 8, with an increase in the size of the weight (an increase in the load applied to the disk), there is an increase in the noise. In the case in which a cushion (vibration-absorbing member) is provided, however, the degree of increase in noise is less than the case in which a cushion is not provided. Taking the case of horizontal placement, for example, increasing the weight from 0 to 0.3 gram without a cushion resulted in an increase in noise of 23.88 dB, whereas under the same conditions but with one cushion, the increase in noise was only 17.89 dB. As shown in FIG. 8, it can be seen that the noise is reduced as the number of cushions is increased. Additionally, there is less noise with the disk in the vertical position than in the horizontal position.

The foregoing is a description of an exemplary embodiment in which the present invention is applied, and it will be understood that the present invention is not restricted to the above-described embodiment, and can be embodied in a variety of other forms.

Figure 6:
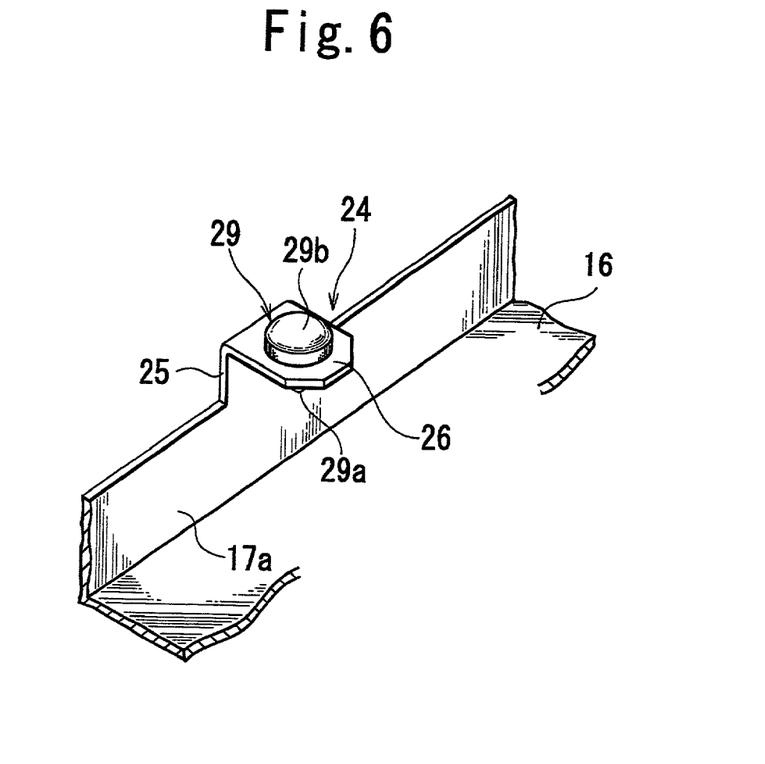
FIG. 6 is a partial enlarged oblique view showing an example in which the vibration-absorbing member is inserted into a hole formed in the protrusion.
Figure 7:
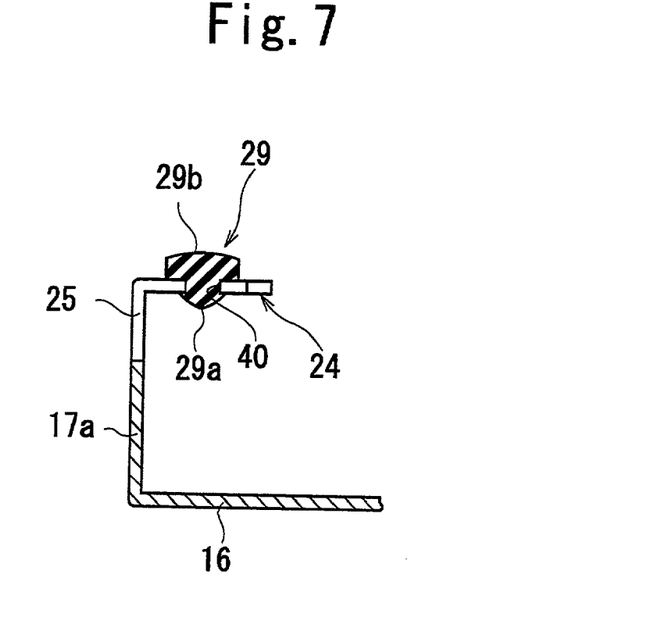
FIG. 7 is a cross-sectional view showing part of FIG. 6 cut away.

For example, in the above-described embodiment, although the vibration-absorbing member 29 is buried in the protrusion 24 provided on the moving plate 15, it is alternately possible, as shown in FIG. 6 and FIG. 7, to form a hole 40 in the attachment piece 26 of the protrusion 24 and to insert the vibration-absorbing member 29 into this hole 40. That is, the shape of the vibration-absorbing member 29 is such that it has a conical insertion part 29a and a contacting part 29b which comes into contact with the rear surface 3a of the disk tray 3, so that the insertion part 29a is inserted into the hole 40 formed in the attachment piece 26.

In this manner, even in the case in which the vibration-absorbing member 29 is inserted into the hole 40 formed in the attachment piece 26, in the same manner as described in the above-noted embodiment, in which the vibration-absorbing member is buried into the attachment piece 26, vibration transmitted to the disk tray 3 caused by rotation of the disk 2 or seeking of the optical pickup mechanism 6 is absorbed by the vibration-absorbing member 29. By mounting the vibration-absorbing member 29 by insertion into the hole 40 formed in the attachment piece 26, even if oil or the like becomes attached to the protrusion 24, it is possible to mount the vibration-absorbing member 29 to the protrusion 24 without having to clean away the oil or the like.

Additionally, although the foregoing embodiment is described for the case in which there are two vibration-absorbing members 29 provided on the moving plate 15, it is sufficient to have as few as one vibration-absorbing member 29 in order to absorb vibration transmitted to the disk tray 3.

What is claimed is:

1. A disk drive apparatus comprising:
    a main apparatus having a frame;
    a disk tray causing a disk to move between a stored position and a drawn-up position relative to the main apparatus, the disk tray having one surface on which the disk is placed;
    a disk rotational drive mechanism rotationally driving the disk;
    an optical pickup mechanism performing at least one of reading stored information from the disk and writing information onto the disk;
    a movable member supporting the disk rotational drive mechanism and the optical pickup mechanism, the movable member being rotatably supported at one end thereof relative to the frame of the main apparatus;
    an elevator drive mechanism bringing the disk rotational drive mechanism and the optical pickup mechanism closer to or farther away from the disk, with the movable member free to rise and fall; and
    a vibration-absorbing member provided to the other end of the movable member, said vibration-absorbing member being provided to absorb vibrations transmitted to the disk tray;
    wherein, when the disk is moved toward the stored position, the elevator drive mechanism moves the other end of the movable member toward the disk tray, thereby causing the vibration-absorbing member to come into contact with another surface of the disk tray when the disk tray reaches its stored position, and thereby absorb the vibrations transmitted to the disk tray.

2. The disk drive apparatus according to claim 1, wherein the movable member has a protrusion including a rising piece and an attachment piece which extends from an end of the rising piece toward the one end of the movable member, and the vibration-absorbing member is attached to the attachment piece.

3. The disk drive apparatus according to claim 1, wherein the vibration-absorbing member comprises an annular resilient member buried in the protrusion.

4. The disk drive apparatus according to claim 1, wherein the vibration-absorbing member comprises a resilient member, which is inserted into a hole provided in the protrusion.

5. A disk drive apparatus comprising:
    a main apparatus having a frame;
    a disk tray causing a disk to move between a stored position and a drawn-up position relative to the main apparatus, the disk tray comprising one surface on which the disk is placed;
    a disk rotational drive unit rotationally driving the disk;
    an optical pickup unit performing at least one of reading stored information from the disk and writing information onto the disk;
    a movable member supporting the disk rotational drive unit and the optical pickup unit, the movable member being rotatably supported at one end thereof relative to the frame of the main apparatus;
    an elevator drive unit bringing the disk rotational drive unit and the optical pickup unit closer to or farther away from the disk, with the movable member free to rise and fall; and
    a vibration-absorbing member provided to the other end of the movable member, said vibration-absorbing member being provided to absorb vibrations transmitted to the disk tray;
    wherein, when the disk is moved toward the stored position, the elevator drive mechanism moves the other end of the movable member toward the disk tray, thereby causing the vibration-absorbing member to come into contact with another surface of the disk tray when the disk tray reaches its stored position, and thereby absorb the vibrations transmitted to the disk tray.

6. The disk drive apparatus according to claim 5, wherein the movable member has a protrusion including a rising piece and an attachment piece which extends from an end of the rising piece toward the one end of the movable member, and the vibration-absorbing member is attached to the attachment piece.

7. The disk drive apparatus according to claim 5, wherein the vibration-absorbing member comprises an annular resilient member buried in the protrusion.

8. The disk drive apparatus according to claim 5, wherein the vibration-absorbing member comprises a resilient member, which is inserted into a hole provided in the protrusion.

9. A disk drive apparatus comprising:
    a main apparatus;
    a disk tray, slidably supported by the main apparatus, a disk being placed on one surface of the disk tray, movement of the disk tray causing the disk to move between a stored position and a drawn-up position relative to the main apparatus;
    a disk rotational drive mechanism rotationally driving the disk;
    an optical pickup mechanism performing at least one of reading stored information from the disk and writing information onto the disk;
    a movable member supporting the disk rotational drive mechanism and the optical pickup mechanism, the movable member being rotatably supported at one end thereof relative to the main apparatus;
    an elevator drive mechanism causing another end of the movable member to rise and fall relative to the main apparatus, whereby
    when the disk is at the stored position the movable member is moved to a first position,
    when the disk moves between the stored position and the drawn-up position the movable member is moved to a second position,
    when the movable member is at the first position the other end of the movable member comes into proximity to another surface of the disk tray, the disk rotational drive mechanism coming into contact with the disk, and the optical pickup mechanism coming into proximity to the disk, and
    when the movable member is at the second position the other end of the movable member moves away from the other surface of the disk tray, so that the disk rotational drive mechanism and optical pickup mechanism move away from the disk, thereby enabling movement of the disk tray and the disk; and a vibration-absorbing member provided to the other end of the movable member, said vibration-absorbing member being provided to absorb vibrations transmitted to the disk tray;

wherein, when the disk is moved toward the stored position, the elevator drive mechanism moves the other end of the movable member toward the disk tray, thereby causing the vibration-absorbing member to come into contact with another surface of the disk tray when the disk tray reaches its stored position, and thereby absorb the vibrations transmitted to the disk tray.

10. The disk drive apparatus according to claim 9, wherein the movable member has a protrusion that extends toward the one end of the movable member from the other end thereof, and the vibration-absorbing member is attached to the protrusion.

11. The disk drive apparatus according to claim 9, wherein the movable member has a protrusion that is disposed substantially parallel to the disk in the stored position, and the vibration-absorbing member is attached to the protrusion.

12. The disk drive apparatus according to claim 11, wherein the movable member has a side wall on the other end thereof, the protrusion extending as one therewith from an edge of the side wall.

13. The disk drive apparatus according to claim 12, wherein the protrusion comprises a rising piece continuous from an edge of the side wall and an attachment piece extending from an end of the rising piece toward the end of the movable member, and wherein the movable member is attached to the attachment piece.

14. The disk drive apparatus according to claim 9, wherein the vibration-absorbing member comprises an annular resilient member buried into the protrusion.

15. The disk drive apparatus according to claim 9, wherein the protrusion has a hole, and wherein the vibration-absorbing member comprises a resilient member inserted into the hole of the protrusion.

* * * * *